United States Patent
Reddy et al.

(10) Patent No.: US 7,900,702 B2
(45) Date of Patent: Mar. 8, 2011

(54) SILICONE-TACKIFIER MATRIXES AND METHODS OF USE THEREOF

(75) Inventors: B. Raghava Reddy, Duncan, OK (US); Michael J. R. Segura, Duncan, OK (US); Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 174 days.

(21) Appl. No.: 11/447,456

(22) Filed: Jun. 6, 2006

(65) Prior Publication Data
US 2007/0277978 A1    Dec. 6, 2007

(51) Int. Cl.
*E21B 43/16* (2006.01)
*E21B 43/02* (2006.01)
*C09K 8/56* (2006.01)

(52) U.S. Cl. ............... 166/276; 166/305.1; 166/293; 166/278; 166/300

(58) Field of Classification Search .............. None
See application file for complete search history.

(56) References Cited

U.S. PATENT DOCUMENTS

| | | | | |
|---|---|---|---|---|
| 3,150,116 A * | 9/1964 | Masters | ............ | 528/12 |
| 3,158,209 A * | 11/1964 | William et al. | ............ | 175/59 |
| 3,285,339 A * | 11/1966 | Walther et al. | ............ | 166/295 |
| 3,443,637 A * | 5/1969 | Bond et al. | ............ | 166/295 |
| 3,815,680 A * | 6/1974 | McGuire et al. | ............ | 166/281 |
| 4,000,781 A * | 1/1977 | Knapp | ............ | 166/276 |
| 4,102,834 A | 7/1978 | Morimoto et al. | | |
| 4,442,896 A * | 4/1984 | Reale et al. | ............ | 166/278 |
| 4,774,297 A | 9/1988 | Murakami et al. | | |
| 5,207,934 A * | 5/1993 | Dovan et al. | ............ | 507/215 |
| 5,314,023 A * | 5/1994 | Dartez et al. | ............ | 166/295 |
| 5,411,104 A * | 5/1995 | Stanley | ............ | 175/65 |
| 5,520,250 A * | 5/1996 | Harry et al. | ............ | 166/278 |
| 5,833,000 A | 11/1998 | Weaver et al. | ............ | 166/276 |
| 5,839,510 A | 11/1998 | Weaver et al. | ............ | 166/276 |
| 5,853,048 A | 12/1998 | Weaver et al. | ............ | 166/279 |
| 6,439,309 B1 * | 8/2002 | Matherly et al. | ............ | 166/276 |
| 6,488,091 B1 | 12/2002 | Weaver et al. | ............ | 166/300 |
| 6,528,157 B1 * | 3/2003 | Hussain et al. | ............ | 428/325 |
| 6,632,537 B2 | 10/2003 | Shores | | |
| 6,830,105 B2 | 12/2004 | Thesing | ............ | 166/280.1 |
| 7,500,519 B2 | 3/2009 | Weaver et al. | | |

(Continued)

FOREIGN PATENT DOCUMENTS

WO    WO 2007/057637 A1    5/2007

OTHER PUBLICATIONS

International Search Report and Written Opinion for Application No. PCT/GB2007/002073, Jun. 6, 2007.
Office Action for U.S. Appl. No. 11/447,453, dated Apr. 29, 2009.
Notice of Allowance from U.S. Appl. No. 11/447,453 dated Mar. 10, 2010.

(Continued)

*Primary Examiner* — Zakiya W Bates
*Assistant Examiner* — Angela M Ditrani
(74) *Attorney, Agent, or Firm* — Robert A. Kent; McDermott Will & Emery LLP

(57) ABSTRACT

In one embodiment, the present invention provides a method comprising providing a treatment fluid that comprises a base fluid and a silicone-tackifier matrix composition that comprises at least one silicone polymer component, at least one tackifying agent, and at least one curing agent and/or at least one cross linking agent; placing the treatment fluid in a subterranean formation; and allowing the silicone-tackifier matrix to form at least one silicone-tackifier matrix therein.

16 Claims, 9 Drawing Sheets

U.S. PATENT DOCUMENTS

2005/0092489 A1* 5/2005 Welton et al. ............. 166/280.2
2007/0161515 A1   7/2007 Bicerano .................... 507/117
2008/0006338 A1* 1/2008 Wideman et al. ........... 138/126

OTHER PUBLICATIONS

Office Action from U.S. Appl. No. 11/447,453 dated Jan. 7, 2010.

* cited by examiner

SILICONE-TACKIFIER MATRIXES AND METHODS OF USE THEREOF

BACKGROUND

The present invention relates to methods and compositions for reducing proppant and particulate flow-back, (referred to herein collectively as "particulate migration"). More particularly, the present invention relates to the use of novel silicone matrixes for reducing particulate migration in subterranean formations, for example, during fracturing and production operations.

Hydraulic fracturing is a process commonly used to increase the flow of desirable fluids from a portion of a subterranean formation. Traditional hydraulic fracturing operations comprise placing a fracturing fluid into a portion of a subterranean formation at a rate and pressure such that fractures are formed or enhanced into the portion of the subterranean zone. The fractures tend to propagate as vertical and/or horizontal cracks located radially outward from the well bore. In such treatments, once the hydraulic pressure is released, the fractures formed will tend to close back onto themselves. To prevent this, oftentimes particulate materials, known as proppant, are placed in the fractures by transporting them in the fracturing fluid during at least a portion of the fracturing operation. The particulates are carried into the created or natural fractures and deposited therein such that when the hydraulic pressure is released the particulates act to prevent the fracture(s) from fully closing, and thus, aid in forming conductive channels through which produced fluids may flow into the well bore. Without the proppant particulate materials, the fractures tend to close and reduce permeability gained by the fracturing operation. The term "propped fracture" as used herein refers to a fracture (natural or otherwise) in a portion of subterranean formation that contains some proppant particulates. The proppant particulates in a fracture often consolidate to form a proppant pack. The term "proppant pack" refers to a collection of a mass of proppant particulates within a fracture. Proppant packs can minimize the flow-back of proppant from the fractures. Oftentimes, the proppant particulates are coated with a substance (e.g., a resin, a tackifying agent, or the like) that enables them to form proppant packs more easily.

Hydrocarbon wells are often located in subterranean zones that contain unconsolidated particulates (e.g., proppant and formation fines) that may migrate within the subterranean formation with the oil, gas, water, and/or other desirable fluids produced by a well. The presence of these unconsolidated particulates in produced fluids generally is disadvantageous and undesirable in that the particulates may abrade pumping and other producing equipment and reduce the fluid production capabilities of producing zones. The particulates also may impact negatively the permeability of the formation. Unconsolidated subterranean formations include those that contain portions that contain loose particulates (e.g., proppant and formation fines) and those wherein the bonded particulates have insufficient bond strength to withstand the forces produced by the production of fluids through the zones.

One traditional method of controlling particulate migration in zones of a subterranean formation involves placing a filtration bed containing gravel particulates near the well bore that neighbors the zone that contains unconsolidated particulates. The filtration bed acts as a sort of physical barrier to the transport of unconsolidated particulates to the well bore that could be produced with the produced fluids. Typically, such so-called "gravel packing operations" involve the pumping and placement of a quantity of desired particulates into the unconsolidated formation in an area adjacent the well bore.

One common type of gravel packing operation involves placing a sand control screen in the well bore and packing the annulus between the screen and the well bore with gravel of a specific size designed to prevent the passage of formation sand. The sand control screen is generally a filter assembly used to retain the gravel placed during a gravel pack operation. A wide range of sizes and screen configurations are available to suit the characteristics of the gravel pack sand used. Similarly, a wide range of sizes of gravel is available to suit the characteristics of the unconsolidated particulates. Oftentimes, the gravel particulates are coated with a substance (e.g., a resin, a tackifying agent, or the like) that enables them to form gravel packs more easily. The resulting gravel pack presents a barrier to migrating sand from the formation while still permitting fluid flow. When installing the gravel pack, the gravel is carried to the annulus in the form of a slurry by mixing the gravel with a fluid, often known as a "gravel pack fluid." Sometimes gravel pack fluids are viscosified with suitable gelling agents. Once the gravel is placed in the well bore, the viscosity of the fluid is reduced, and it is returned to the surface. In some gravel packing operations, commonly known as "high rate water packing operations," the fluid has a lower viscosity and yet the gravel is transported because the treatment occurs at a high velocity. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing. Such packs may be time consuming and expensive to install.

Another similar method involves applying a non-aqueous tackifying composition to the unconsolidated particulates in an effort to reduce the migration of particulates within the zone. Whereas a curable resin composition produces a hard mass, the use of a non-aqueous tackifying composition produces a more malleable consolidated mass that retains a tacky character. One potential disadvantage associated with such systems is that because of their tackiness and tendency to stick to surfaces, significant amounts of the material may be lost by absorption to undesired surfaces during placement. Another alternative is an aqueous tackifying composition. Aqueous tackifying compositions, however, have their own problems including, but not limited to, the fact that they usually require external activators and surfactants for optimum performance. One problem associated with tackifying agents is that they tend to leach out of the desired area once placed in the formation. This leaching may be due to partial solubility in produced fluids or to dislodgement from the surfaces by flowing fluids or abrasive action of particulates in the produced fluids.

In some instances, it may be desirable to use both a resin and a tackifying composition together to obtain the benefits of both a resin and a tackifier. For example, if the tackifying agent is aimed at coating the formation surfaces to trap the fines, any fines that are not trapped by the tacky formation surface would flow with the produced fluids. However, if the proppant itself is rendered tacky either exclusively or in addition to coating the formation with tacky materials, then any fines that are not trapped by the formation surface will be trapped by the tacky proppant surface. The latter process may be more effective because proppant is thought to offer more flowing surface to a flowing fluid due to increased tortuosity in the flow path, thus increasing the probability of trapping the fines in the produced fluid. However, this is not usually possible because the tackifying agent reacts with the resin so that it becomes hardened, and does not remain tacky as desired. Since it does not remain tacky, it may not help with fine migration as intended.

SUMMARY

The present invention relates to methods and compositions for reducing particulate migration. More particularly, the present invention relates to the use of novel silicone matrixes for reducing particulate migration in subterranean formations, for example, during fracturing and production operations.

In one embodiment, the present invention provides a method comprising providing a treatment fluid that comprises a base fluid and a silicone-tackifier matrix composition that comprises at least one silicone polymer component, at least one tackifying agent, and at least one curing agent and/or at least one cross linking agent; placing the treatment fluid in a subterranean formation; and allowing the silicone-tackifier matrix to form at least one silicone-tackifier matrix therein.

In one embodiment, the present invention provides a method of treating a portion of a subterranean formation comprising providing a silicone-tackifier matrix composition that comprises at least one silicone polymer component, at least one tackifying agent, and at least one curing agent and/or at least one cross linking agent; introducing the silicone-tackifier matrix composition to a chosen portion of a subterranean formation; and allowing the silicone-tackifier matrix composition to form therein at least one silicone-tackifier matrix that is capable of preventing particulate migration therein.

In one embodiment, the present invention provides a method comprising providing a pre-pad or pad fluid that comprises a silicone-tackifier matrix composition a silicone-tackifier matrix composition that comprises at least one silicone polymer component, at least one tackifying agent, and at least one curing agent and/or at least one cross linking agent; placing the fluid into a portion of the subterranean formation; and allowing the silicone-tackifier matrix composition to consolidate at least a few particulates within the portion of the subterranean formation.

In one embodiment, the present invention provides a method comprising providing a fracturing fluid comprising a plurality of proppant particulates, at least one of which having been coated with a silicone-tackifier matrix composition that comprises at least one silicone polymer component, at least one tackifying agent, and at least one curing agent and/or at least one cross linking agent; placing the fracturing fluid into a portion of the subterranean formation at a pressure sufficient to create or enhance a fracture therein; and allowing the proppant particulates to consolidate to form a cohesive mass within the formation.

In one embodiment, the present invention provides a method comprising providing a gravel pack fluid that comprises gravel, a brine, optionally a gelling agent, and a silicone-tackifier matrix composition that comprises at least one silicone polymer component, at least one tackifying agent, and at least one curing agent and/or at least one cross linking agent; contacting the portion of the subterranean formation with the gravel pack fluid so as to place a gravel pack in or near a portion of the subterranean formation; allowing the silicone-tackifier matrix composition to form a silicone-tackifier matrix in or near the gravel pack; and allowing the matrix to stabilize or prevent the flow of particulates within the subterranean formation.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

Figure 3:
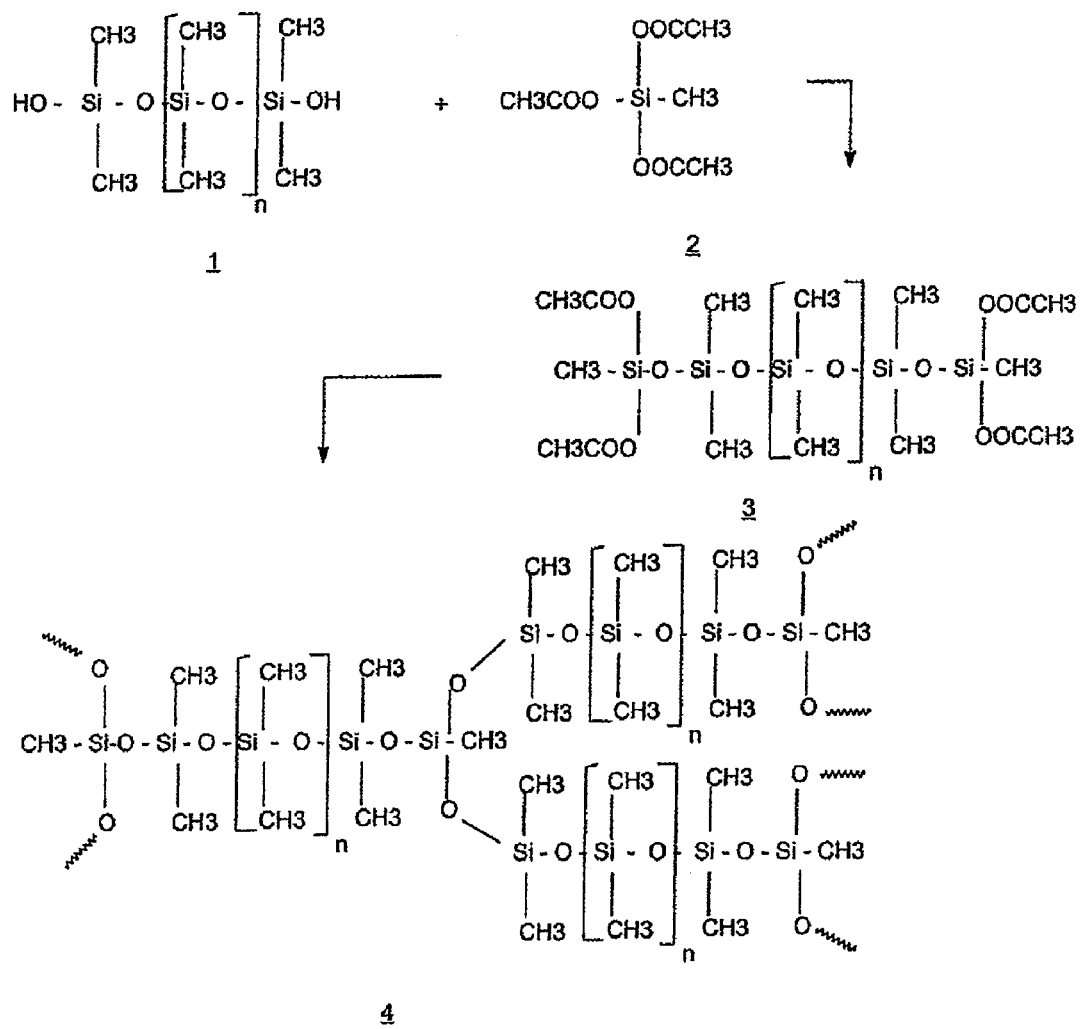

An example of a cross linking reaction using a silane cross linker is shown in FIG. 3.

Figure 4:
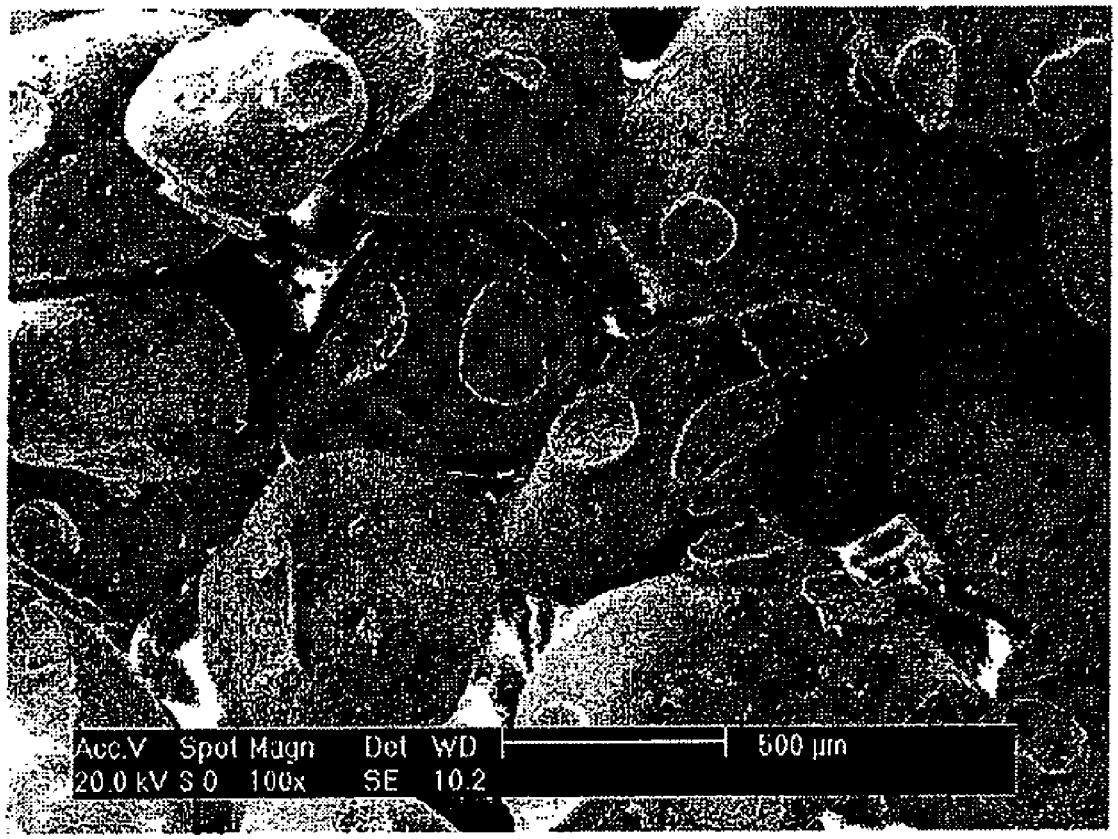

FIG. 4 is a copy of an SEM photograph of a silicone coated sand (3 wt %) after proppant flow back testing at 100×.

Figure 5:
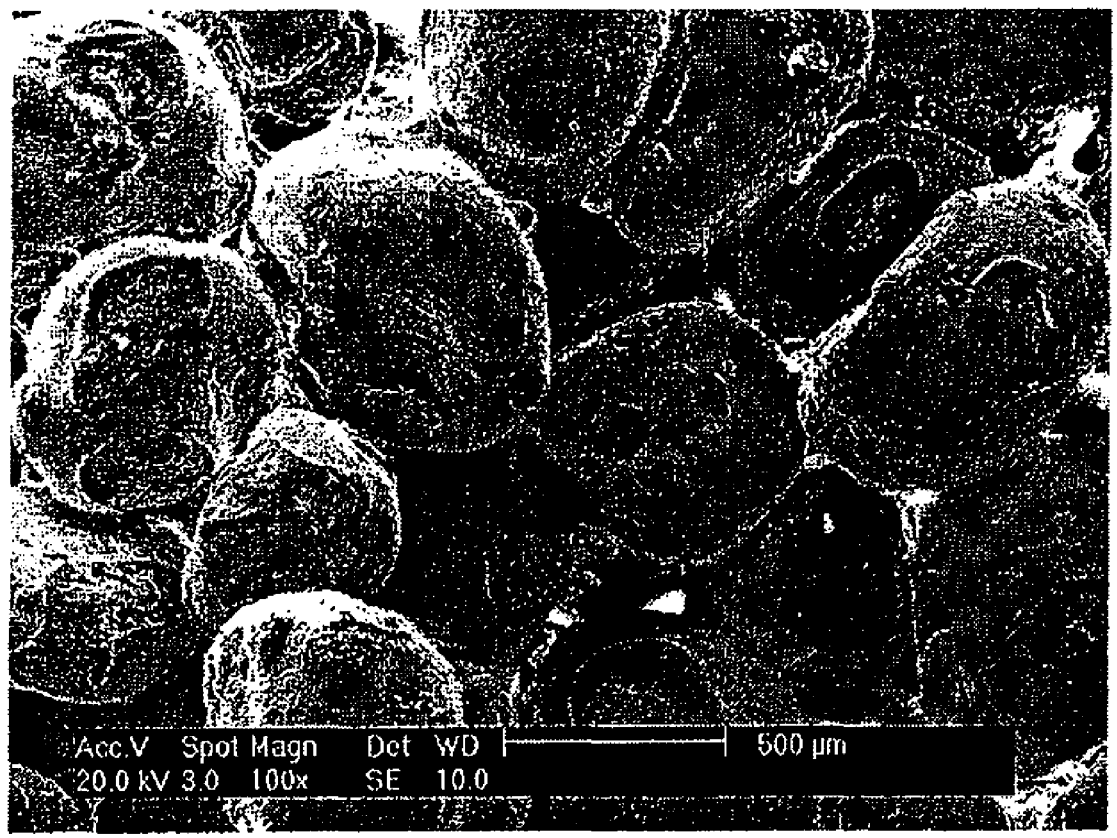

FIG. 5 is a copy of an SEM photograph of GI-1210/PIB coated sand (3 wt %) after proppant flow back testing at 100×.

Figure 6:
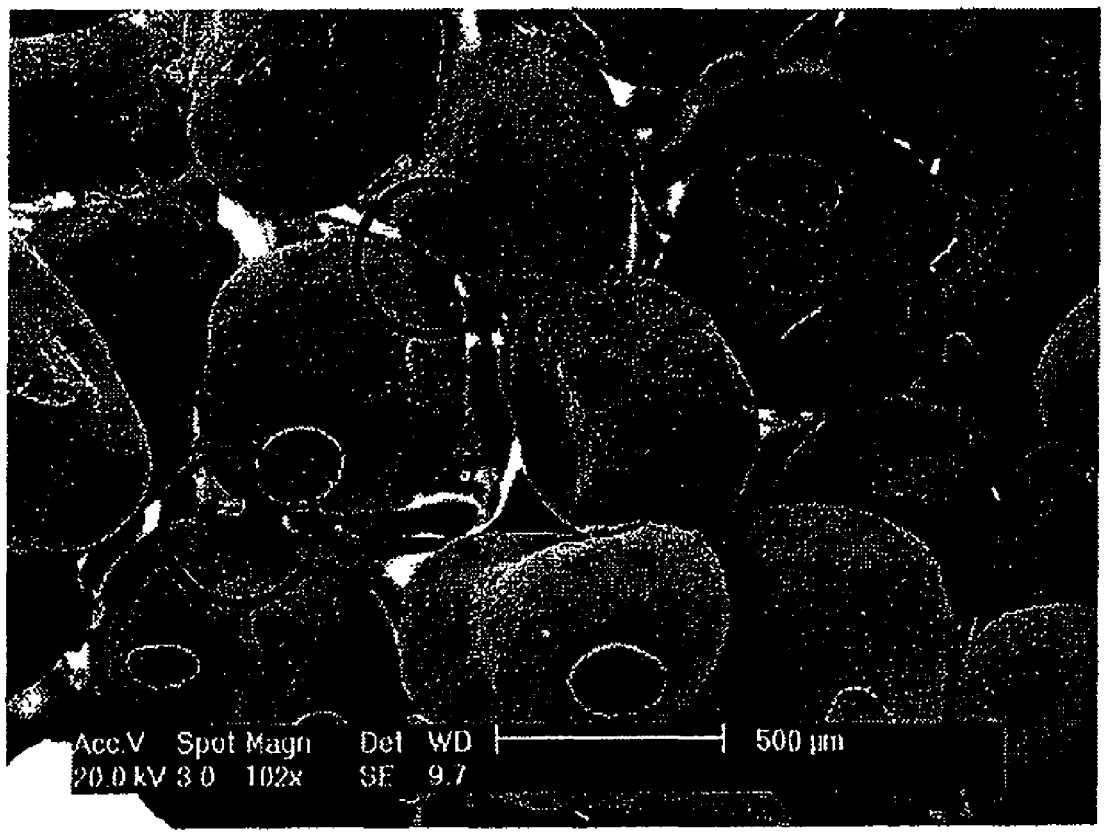

FIG. 6 is a copy of an SEM photograph of silicone coated sand (2 wt % coating) at 100×. Contact points have been circled.

Figure 7:
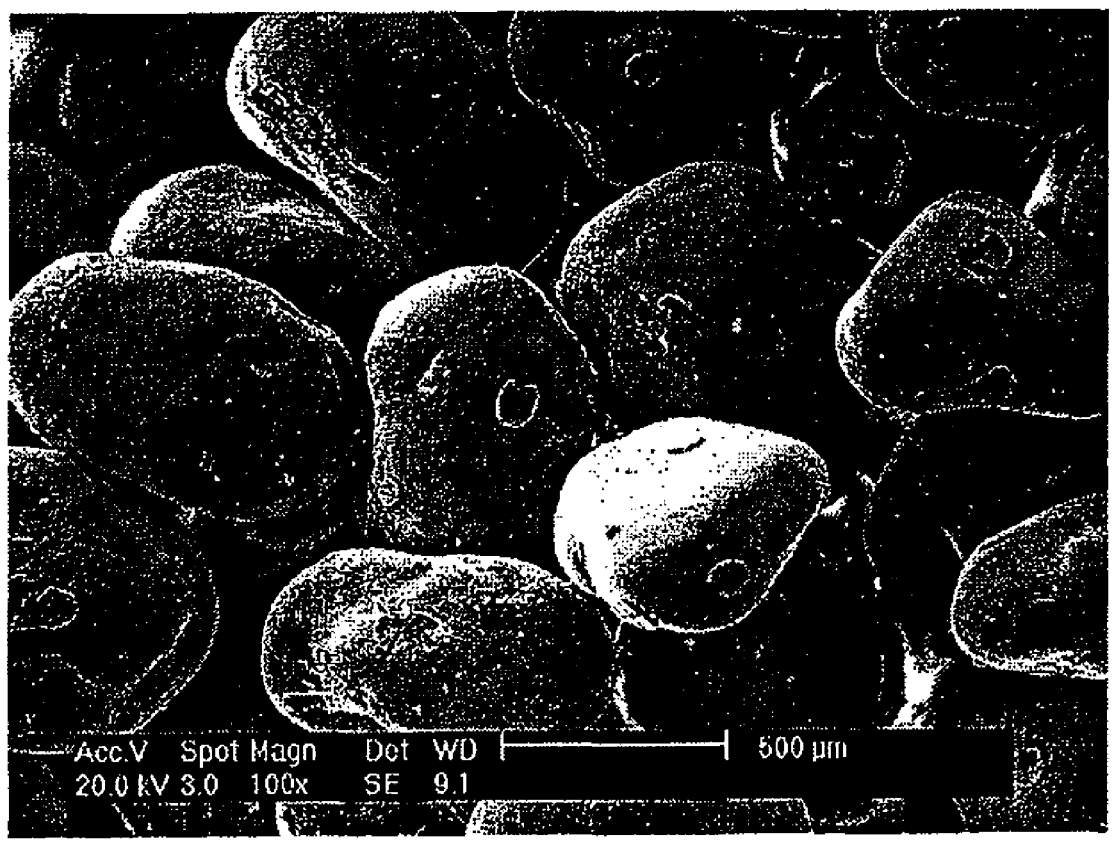

FIG. 7 is a copy of an SEM photograph of silicone coated sand (1 wt % coating) at 100×.

Figure 8:
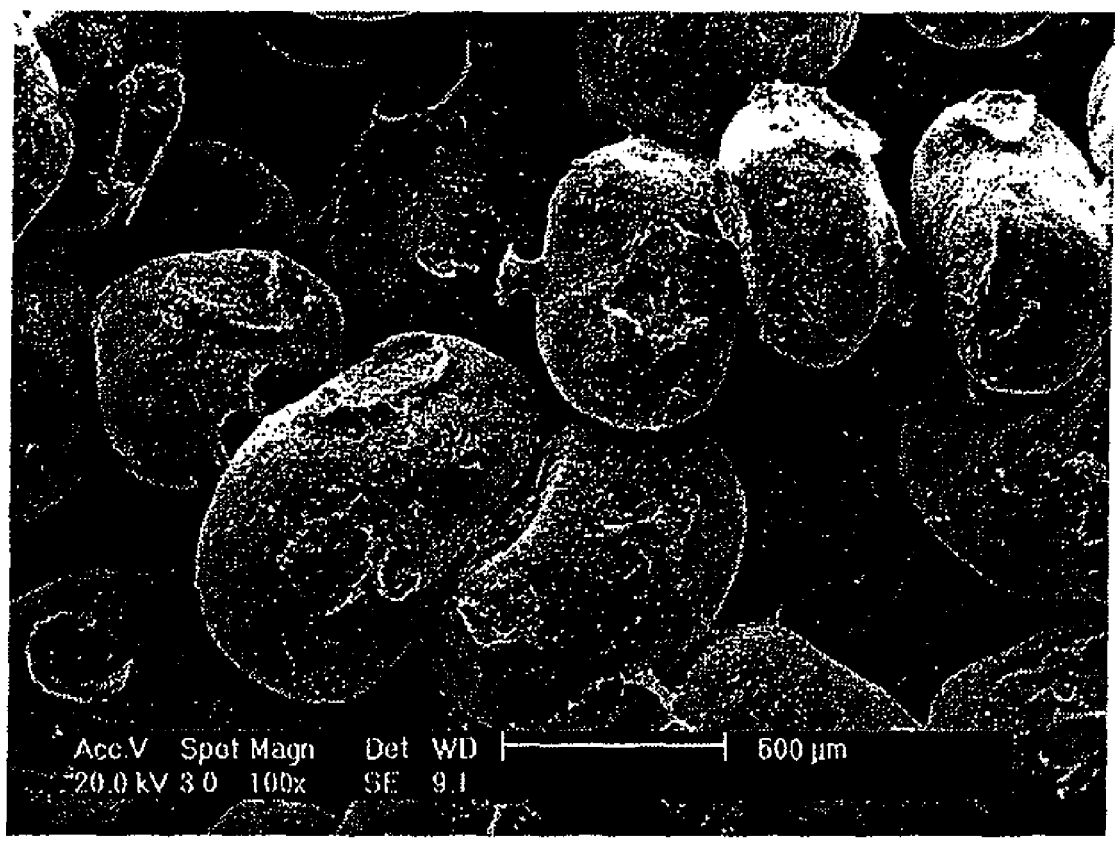

FIG. 8 is a copy of an SEM photograph of silicone coated sand (3 wt %) at 100×.

Figure 9:
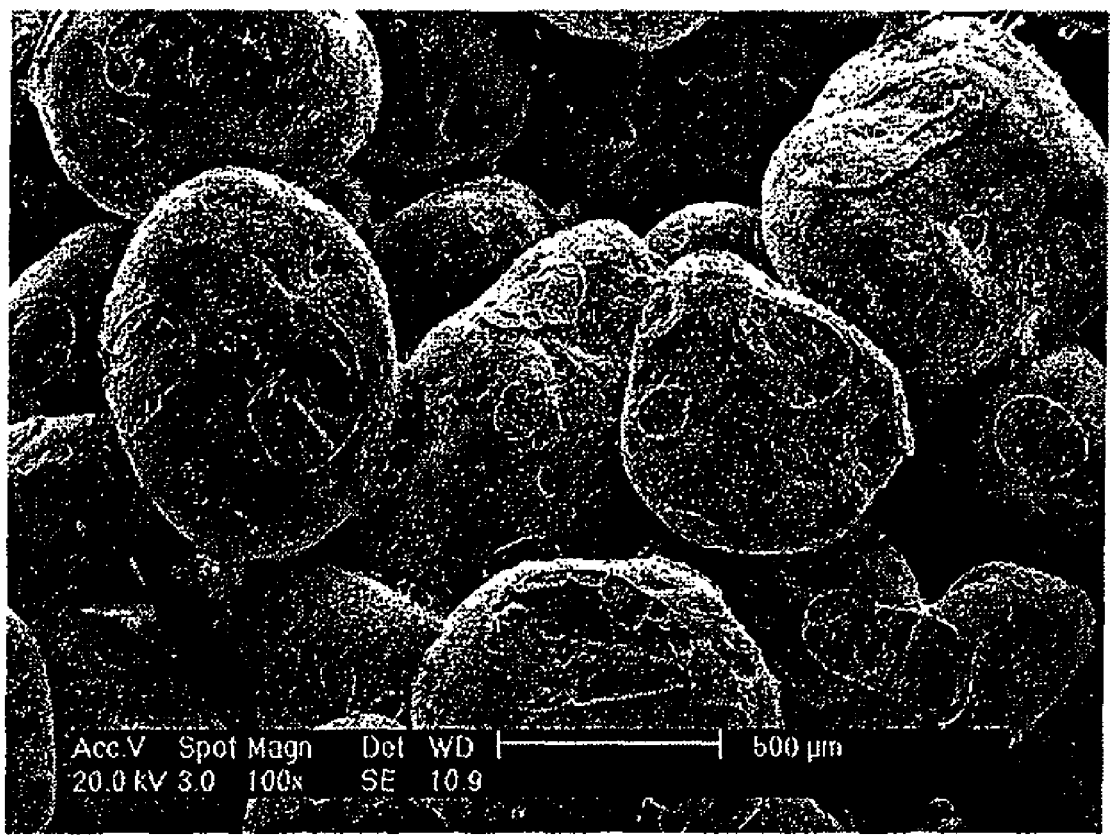

FIG. 9 is a copy of an SEM photograph of silicone coated sand (3 wt %) after extraction and heating at 100×.

DESCRIPTION OF PREFERRED EMBODIMENTS

The present invention relates to methods and compositions for reducing particulate migration. More particularly, the present invention relates to the use of novel silicone matrixes for reducing particulate migration in subterranean formations, for example, during fracturing and production operations.

Figure 1:
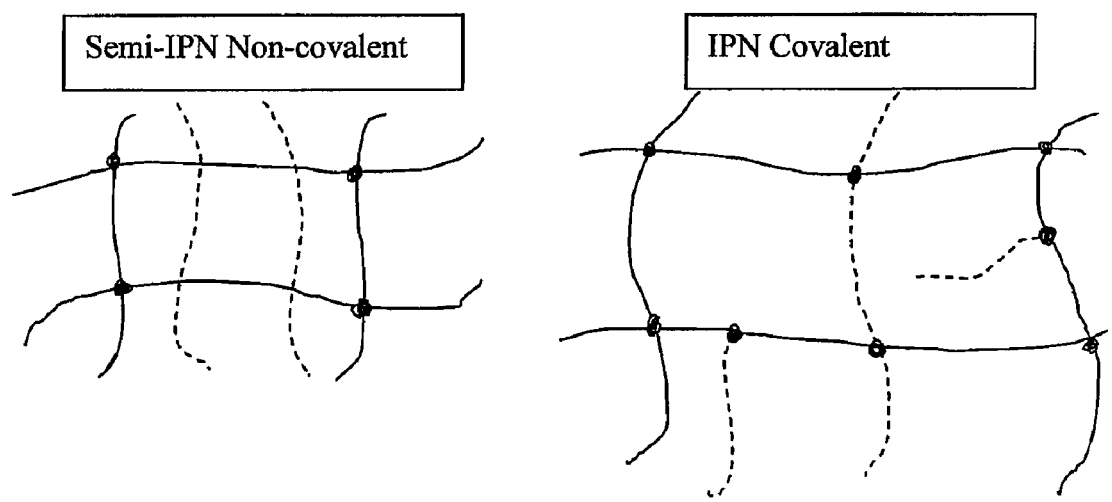
FIG. 1 is a picture of a theoretical embodiment of a silicone matrix (solid line) wherein a tackifying agent (dotted line) is entrapped.
Figure 2:
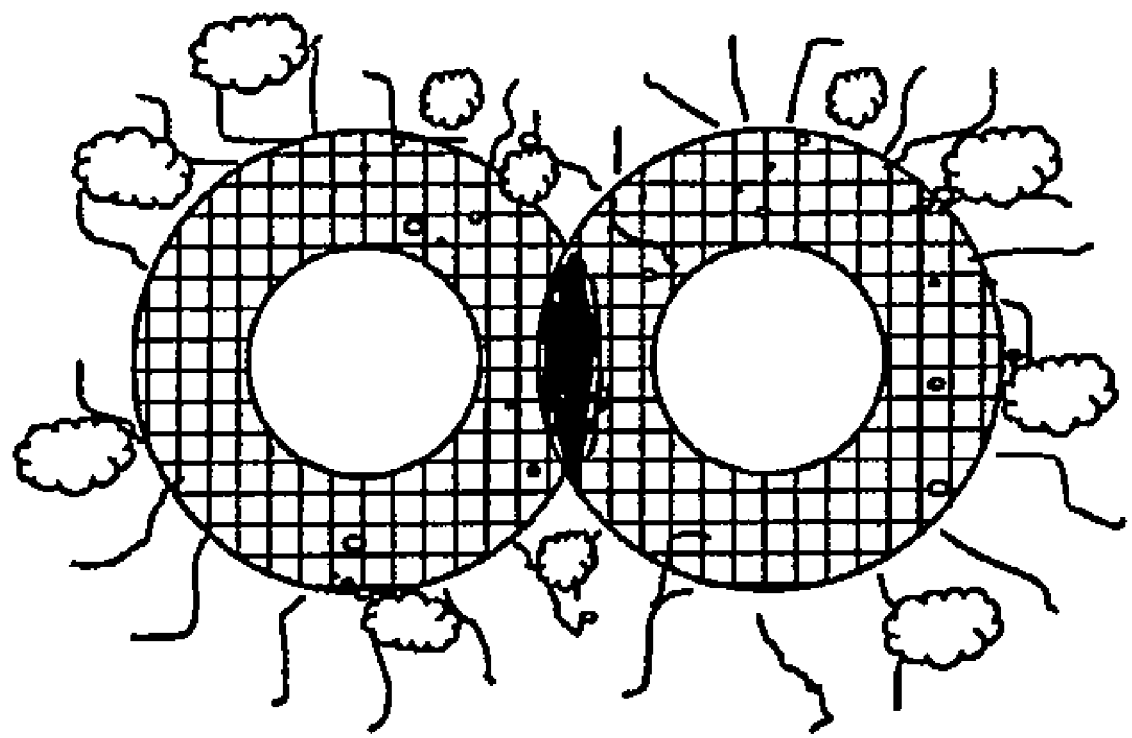
FIG. 2 represents consolidated sand grains.

It is believed that upon curing, the silicone matrixes of the present invention are cross linked network matrixes that entrap the tackifying agent in the network to prevent it from leaching out of the well bore or the formation, which allows the tackifying agent to remain in the desired area within the formation to aid in reducing particulate migration. This entrapment of the tackifying agent is thought to occur by chemically co-curing the tackifiers with the silicone materials or physically entrapping the tackifier molecular chains in the 3-dimensional cross-linked network of cured silicone matrix. The term "matrix," as used herein, refers to a surrounding structure with short chain segments in between the cross-linking junction points forming a molecular mesh within which a tackifying agent may be entrapped. The term "entrapped" as used herein (and its derivatives) does not imply any particular degree of entrapment or containment. When the tackifier is physically trapped in the matrix, it may be referred to as non-covalent semi-IPN, whereas when it is trapped in the matrix by covalent bond formation to the matrix it may be referred to as covalent-IPN. FIG. 1 is a schematic diagram of a theoretical embodiment of a silicone matrix (solid line) wherein a tackifying agent (dotted line) is entrapped. Note that in some embodiments, the particulates may be located on the outside of the matrix. In FIG. 2, which represents consolidated sand grains, the center circle represents a sand particle; the mesh portion the silicone matrix with strands coming out of the matrix represents a tackifier molecule; and the wavy shapes on the outside represents trapped fine particulates. Although FIGS. 1 and 2 have been included to help one understand the present invention, they should not be viewed as exclusive depictions of such concepts or representations of preferred embodiments.

One of the many advantages of the silicone-tackifier matrix compositions of the present invention is thought to be that the advantages of both the silicone polymer and the tackifying agent can be realized, without one unduly compromising the other. The silicone polymer forms an elastomeric matrix material upon curing, which is desirable because it may consolidate particulates in the formation into relatively stable hardened resilient aggregate masses without compromising conductivity. As used herein, the phrase "relatively stable hardened resilient aggregate masses" refers to a consolidated mass comprising multiple particulates that can resist forces that may dislodge or break the constituent particulates apart due to the flowing of well bore fluids. The tackifying agent retains its tacky nature, which is desirable for reducing particulate migration. In the case of a propped fracture, the silicone-tackifier matrix compositions may consolidate the particulates of the formation along the fracture faces into relatively stable hardened permeable masses. In addition to encouraging the proppant particulates to form aggregates, the use of a tackifying agent may yield a propped fracture that can withstand the effects of stress cycling and high drag forces to allow very little or no undesirable proppant flow back. The application of a tackifying agent to the proppant particulates may aid in the formation of proppant aggregates or clusters prior to consolidation reactions, and also should increase the ability of a smaller amount of proppant particulates to effectively hold a fracture open under stress for production. In this way, the matrixes may be thought of as having a dual functionality (inter alia reducing proppant flow back and fine migration control), which is desirable. In some embodiments, the compositions of the present invention may be useful to combat or manage or minimize crushed proppant flow back because such crushed particulates are held inside the silicone matrixes. Silicone based polymers are also thought to be thermally stable and chemical resistant. As such, they may be suitable for applications in harsh chemical environments, for example, those in the temperature range of from below ambient temperatures to about 500° F.

The silicone-tackifier matrix compositions of the present invention comprise at least one silicone polymer component, at least one curing agent or cross linking agent, and a tackifying agent. For the purposes of this application, a "curing agent" refers to a reactive or catalyst material that, under suitable conditions, initiates polymerization reactions involving curable resin materials. In some cases the curing agent may become reactive after undergoing some reaction, for example scission of some bonds as in homolytic scission of peroxide bonds in organic peroxides. Curing agents may participate in the initiating step of the curing process by chemically reacting with the resin material, thus generating a reactive form of the resin. This reactive form of the resin reacts further with other resin molecules to completion (at least hypothetically) without further involvement from the curing agent. At the end of the curing process, a portion or all of the curing agent(s) may become chemically incorporated into the cured material. Organic peroxides are examples of curing agents. Catalysts, on the other hand, cure resin materials by participating in chemical reactions in all stages of the curing process, but do not become chemically incorporated into the final cured material. They primarily facilitate the reaction to take place under milder conditions by, inter alia, lowering the energy of activation. The term "cross linking agent" as used herein refers to a molecule that contains multiple reactive groups, at least two per molecule, from which the curing reactions of the resin take place. The functional groups on the cross linking agents may react with reactive groups of the resins (at least per molecule) and these reactions between the cross linking agent and the resin may continue to take place until significant amounts of the entire amounts of the resin(s) are cured. In other words, the cross-linking agent or a reactive species generated from it, serves to connect two or more resin molecules. The cross linking agent or portions thereof may become incorporated into the cured network structure of the resin. Examples of cross linking agents include, but are not limited to: silanes comprising trialkoxy groups in which the three alkoxy groups can participate in the cross linking reactions.

Optionally, the silicone-tackifier matrix compositions of the present invention may comprise a non-silicone material such as, but not limited to, an aliphatic alcohol, epoxide, isocyanate, ester, halide, amine, carboxylic anhydride, olefin, or a derivative or combination of such materials. The non-silicone materials may be monofunctional, difunctional, trifunctional or tetrafunctional and may be made to react with silicone material if desired. Such non-silicone materials may also function as diluents, rheology modifiers, cross linkers, or tackifiers by incorporating either chemically or physically into the silicone matrix, or form matrix either by themselves or become incorporated into silicone matrix. Including such materials also may be beneficial, for example, to affect the polarity of the silicone-tackifier matrixes once formed, e.g., to make the matrixes more hydrophobic or hydrophilic.

Additionally, the silicone-tackifier matrix compositions of the present invention may comprise a mutual solvent. Such a solvent may be advantageous, for example, to mix the silicone polymer component and the tackifying agent so that they can be coated onto particulates (e.g., proppant or gravel), which may be dry, water-wet, or oil-wet. Solvents suitable for use with the non-aqueous tackifying agents of the present invention include any solvent that is compatible with the silicone polymer component and the tackifying agent, and achieves the desired viscosity effect while being miscible (at least partially) with water-based fluids. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfryl acetate, butyl lactate, dimethyl sulfoxide, dimethyl formamide, fatty acid methyl esters, and derivatives or combinations thereof. It is within the ability of one skilled in the art, with the benefit of this disclosure, to determine whether a solvent is needed to achieve a viscosity suitable to the subterranean conditions and, if so, how much. Such mutual solvents also should render the silicone tackifier formulations water dispersible, which may allow them to be used as water based matrix treatment fluids.

The silicone-tackifier matrix compositions of the present invention may also comprise coupling agents, which may be referred to as adhesion promoting agents, that may aid in improved adhesion of the silicone-tackifier compositions to inorganic surfaces such as sand or formation surfaces. The term "coupling agent" as used herein refers to a material that helps in bonding at the interface between two incompatible or immiscible materials, for example, the bonding between an inorganic surface and organic polymer or resin. Such materials include, but are not limited to, silane coupling agents containing silicon alkoxy bonds such as 3-aminopropyltriethoxysilane or N-2-aminoethyl-3-aminopropyltriethoxysilane, which are available as "SILQUEST A1100" and "SILQUEST A1120" respectively from Crompton Corporation, Middlebury, Conn. Other coupling agents that may be used in conjunction with the present invention include trimethoxysilylpropyl diethyelene triamine, 3-glycidoxypropyltroimethoxysilane, 3-mercaptopropyltrimethoxysilane, 3-methacryloxypropyltrimethoxysilane, and derivatives or combinations thereof.

A. Suitable Silicone Polymer Components

The silicone polymer components suitable for use in the silicone-tackifier matrix compositions of the present invention comprise silicone polymers that include at least two reactive groups. Examples of such reactive groups include, but are not limited to, epoxy groups, hydroxy groups, olefinic groups, hydride groups, isocyanate groups, acrylate, and acetoxy, enoxy, oxime, alkoxy, amine, and amide groups (and derivatives or combinations thereof), which may facilitate curing. The silicone polymer component forms an elastomer upon curing. Suitable silicone polymers, in addition to carrying reactive groups, may also have ionic groups to provide a cationic, anionic or zwitterionic nature to the molecules. Such charged polymers should provide improved adhesion of the silane matrix to a proppant or particulate surface. In certain embodiments of the present invention, combinations of silicone polymers which contain different reactive groups may be used to control the rate and the extent of curing during placement. Silicone elastomers tend to have higher thermal stability than many other types of polymeric materials. In some embodiments of the present invention, the silicone polymer component may be self-curing, and may be referred to as Room Temperature-Curing ("RTV") silicones.

The silicone polymers are considered to be self curing if the curing requires presence of moisture in the environment and may or may not require a catalyst. Silicones functionalized with acetoxy, enoxy, oxime, alkoxy, amine, amide groups are examples of RTV silicones which may require traces of moisture in the environment to achieve rapid curing (for example, <5 minutes to 5 hrs). While such silicones containing such reactive groups are commercially available, for example under the trade names "DMS-D33," "DMS-XE11" and "DMS-XM 11" from Gelest, Inc, Morrisville, Pa., in practice, such reactive groups may be introduced into the silicone polymer by combining silanol functionalized silicones and an excess of a multifunctional silane cross linker containing the above mentioned moisture sensitive reactive groups as shown in FIG. 3. During the compounding stage under moisture free conditions the hydroxyl groups in the silanol may react with the functional groups in the silane and the resulting reactive product remains in that condition until the time of use when upon exposure to moisture it crosslinks by condensing with other polymer molecules. Examples of silane cross linking or curing agents which are useful include methyltrimethoxysilane, vinyltrimethoxysilane, methyltriethoxysilane, tetraethoxysilane, methyltriacetoxysilane, methyl tris-(N-methylbenzamidosilane), methyl tris-(methyl ethyl ketoximino) silane, methyl tris-(methylisobutylketoximino) silane, methyl vinyl bis-(methyl ethylketoximino)silane, tetrakis-(methyl ethylketoximino) silane, methyl tris-(isprenoxy)silane, methyl tris-(cyclohexylamino) silane, and derivatives or combinations thereof. Such cross linkers are available from Gelest, Inc and other silicone suppliers.

The curing or cross linking agents that may be used in the silicone-tackifier matrix compositions of the present invention may be reactive multifunctional silane monomers, metal based catalysts, organic peroxides, or combinations thereof. The reactive multifunctional silane monomers are thought to crosslink the silicone polymer components by reacting with the reactive groups on the matrix forming silicone polymer (see Equation 2). The rate of curing can be enhanced by using a metal based catalysts. Tin catalysts are suitable examples. Other suitable examples include platinum or rhodium catalysts, which can copolymerize and crosslink silicone polymers containing vinyl and hydride reactive groups in reactions known as hydrosilation reactions. Such reactive vinyl and hydride groups may both be present on the same silicone polymer chain or on two separate silicone polymers.

In other embodiments, multiple curing or cross linking agents may be used with the silicone compositions. The curing or cross linking agent may be included in the silicone-tackifier matrix compositions or it can be introduced into the formation after the composition has been introduced into a subterranean formation, e.g., in a subsequent over-flushing step. Suitable curing agents include, but are not limited to, tin compounds, platinum, rhodium compounds, and peroxides. In an embodiment, more than one curing agent is used to control the rate and extent of curing during placement. Thus, for example, a mixture of hydroxy terminated silicone first component curable with tin catalysts at room temperature, and olefin terminated silicone second component curable with platinum or rhodium based catalysts or peroxides at elevated temperatures, in combination with respective curing agents may be used to achieve partial matrix formation during mixing and complete the curing process at down hole temperatures upon placement. By curing the first silicone component during mixing phase provides sufficient network formation to trap the tackifier to render it non-leachable during pumping, and subsequent curing of the second silicone component at formation temperatures serves to consolidate the particulates in situ. If a curing agent is used, approximately about 0.1% to about 10% based on the amount of the silicone polymer component present in the silicon matrix composition may be needed. To determine the appropriate concentration of curing agent to use, one should take into account the temperature of the formation, and the cure time desired. The silicone polymer component should be present in an amount adequate to consolidate a mass of unconsolidated particulates, under conditions of sufficient stress loading and subterranean temperatures into relatively stable hardened permeable masses (e.g., a proppant pack or a gravel pack). In some embodiments, the silicone polymer component may comprise from about 10% to about 95% of a silicone-tackifier matrix composition of the present invention. In preferred embodiments, the silicone polymer component may comprise from about 30% to about 70%.

The silicone component may be provided in a solution form. If so, suitable solvents may include, but are not limited to, crude oil, petroleum distillates, alcohol, butyl alcohol, isopropyl alcohol, a heavy aromatic solvent, xylene, toluene, heavy aromatic naphtha, mutual solvents, ethylene glycol monobutyl ether, propylene carbonate, n-methylpyrrolidone, and derivatives or combinations thereof.

The silicone component may also be blended with reactive or non-reactive diluents if desired. In both cases, the diluents may serve to reduce the viscosity of the composition at the time of mixing or placement, modify the rheology of the matrix silicone component, and/or reduce the cost. The reactive diluents may contain reactive groups, for example, epoxide or hydroxyl groups, one or more per molecule, that are capable of reacting with reactive groups on the matrix forming silicones in the presence or absence of curing agents. Reactive diluents may not form matrix network by themselves even when used in combination with suitable catalysts but may become part of the matrix when used in combination with matrix forming silicones. Examples of reactive groups that reactive diluents may contain include epoxide, isocyanate, an ester, a carboxylic anhydride, a halide, or an olefin. They may also serve to control the degree of curing and elasticity by acting as polymerization chain transferring or chain terminating agents. Non reactive diluents may be silicone or non-silicone based. They may be any liquid hydrocarbon that is miscible with silicone composition and does not detrimentally interfere with the curing process. In an embodiment, the diluent is also a tackifying material. Examples of diluents include petroleum derived oils, alkylphosphates, aliphatic liquid polymers, for example polyisobutylenes, non functionalized liquid polybutadienes, for example "KRASOL LB" products from Sartomer Company, Warrington, Pa., hydroxyterminated liquid polybutadienes, for example, "POLY BD R45HTLO" and "POLY BD R20LM" available from Sartomer Company, or maleic anhydride terminated polybutadienes, for example, "RICOBOND 1731," from Sartomer Company, polyalkylene glycol, poly(propylene oxides), poly(alpha-olefins) and mixtures thereof. Aliphatic liquid polymers, particularly polyisobutylenes and hydroxyterminated polybutadienes are preferable. An example of a suitable silicone based diluent is "GI-THINNER" from Silicones Inc., North Carolina.

Examples of commercially available silicone polymers that are suitable for use in the present invention are from the GI series brand products from Silicones, Inc., in High Point, N.C., which are room temperature vulcanizable ("RTV") types of silicone polymers. Silicones, Inc.'s GI series of silicones are hydroxy terminated silicone polymers that are cured via a condensation mechanism with the aid of tin or titanium catalysts. Tin and titanium based catalysts are available from Silicones Inc., or Gelest, Inc., Morrisville, Pa. The P-Series silicones available from the same supplier have terminal olefin groups and hydride groups and cure by an addition mechanism, referred to as hydrosilation reactions as shown in Equation 2, with the aid of platinum or rhodium catalysts and are suitable for curing at elevated temperatures. These catalysts are available from Gelest, Inc. Both of these are suitable for use in the present invention. Silicones containing vinyl groups are suitable and can be cured with peroxide. Suitable peroxide curable silicones are available as PS 400 series products available from Fluorochem, Derbyshire, UK. Suitable peroxides for curing silicones include benzoyl peroxide, bis(dichlorobenzoyl) peroxide, and dicumyl peroxide.

A schematic representation of condensation reactions between functionalized silicones showing only reactive groups is given in Equation 1.

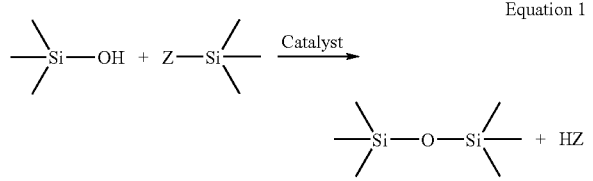

Equation 1 wherein Z may be an acetoxy, enoxy, oxime, alkoxy, a hydride or an amine group.

A schematic representation of an addition reaction catalyzed by platinum, titanium or rhodium is shown in Equation 2.

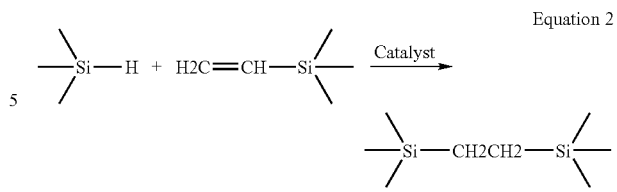

Equation 2

An example of a cross linking reaction using a silane cross linker is shown in FIG. 3. Note that in Structure 4 the wiggly lines represent extension of the network structure containing repetition of the shown structure. The material shown in Structure 3 may be pre-made and mixed with 1 and stored as a RTV resin which can be mixed with a catalyst, such as a tin catalyst, just prior to use.

B. Suitable Tackifying Agents

Tackifying agents suitable for use in the present invention include non-aqueous tackifying agents; and polyisobutylenes. In some embodiments, the tackifying agent may comprise from about 5% to about 60% of a silicone-tackifier matrix composition of the present invention. In preferred embodiments, the tackifying agent may comprise from about 10% to about 70% of a silicone-tackifier matrix composition of the present invention.

1. Suitable Nonaqueous Tackifying Agents

One type of tackifying agent that may be suitable for use in the present invention is a non-aqueous tackifying agent. A particularly preferred group of nonaqueous tackifying agents comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying compounds include liquids and solutions of, for example, polyesters, polycarbonates and polycarbamates, natural resins such as shellac, rosin acids and the like, and derivatives or combinations thereof. Other suitable non-aqueous tackifying agents are described in U.S. Pat. No. 5,853,048 issued to Weaver, et al. and U.S. Pat. No. 5,833,000 issued to Weaver, et al., the relevant disclosures of which are herein incorporated by reference.

Non-aqueous tackifying agents suitable for use in the present invention may be either used such that they form a resilient coating or they may be combined with a multifunctional material capable of reacting with the non-aqueous tackifying agent to form a cohesive coating. A "cohesive coating" as used herein means that the reaction of the tackifying compound with the multifunctional material will result in a substantially non-flowable reaction product that exhibits a higher compressive strength in consolidated agglomerate than the tackifying compound alone with the particulates. In this instance, the non-aqueous tackifying agent may function similarly to a resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as succinic anhydride, epoxides, condensates of furfuraldehyde, glutaraldehyde or formaldehyde and the like, and derivatives or combinations thereof. In some embodiments of the present invention, the multifunctional material may be mixed with the tackifying compound in an amount of from about 0.01% to about 50% by weight of the tackifying compound to effect formation of the reaction product. In some preferable embodiments, the compound is present in an amount of from about 0.1% to about 1% by weight of the tackifying compound. Suitable multifunctional materials are described in U.S. Pat. No. 5,839,510 issued to Weaver, et al., the relevant disclosure of which is herein incorporated by reference. In a preferred embodiment, the multifunctional material is reactive with matrix forming silicone composition substituted with suitable reactive groups as illustrated in FIG. 1, which may be an IPN covalent embodiment.

2. Amorphous Hydrocarbon Resins

Low molecular weight, low glass transition temperature, liquid (at room temperature or become liquids at application temperatures) amorphous polyolefins are suitable tackifiers for use in the present inventions. Examples of amorphous polyolefins include ethylene-propylene copolymers, polyisobutylenes, and atactic polypropylene and the like. The suitable viscosity range includes 20 to 50000 centipoise at 40° C. or average molecular weight range of 150 to 6000. The glass transition temperature is at least −60° C. Polyisobutylene compounds may also be known as 2-methyl-1-propene homopolymer, isobutylene polymer, polymerized 2-methylpropene, and isobutylene resin. Their general molecular formula is: $[C_4H_8]_n$. Polyisobutylene, sometimes called polybutenes, and other times "PIB," is a vinyl polymer, and is very similar to polyethylene and polypropylene in structure, except that every other carbon is substituted with two methyl groups. It is made from the monomer isobutylene, by cationic vinyl polymerization. Usually, a small amount of isoprene is added to the isobutylene. Examples of commercially available PIBs include TPC brand products available from Texas Petrochemicals LP, Houston, Tex. and "INDOPOL" brand products from British Petroleum Corporation. Examples of commercially available ethylene-propylene copolymers include "EASTOFLEX E1003" and "EASTOFLEX D180" available from Eastman Chemical Corporation, Kingsport, Tenn. Atactic polypropylene is available from polypropylene producers for example, Atofina, Feluy, Belgium. Other suitable adhesive materials include polybutadienes which may be either non-functionalized or end-functionalized with hydroxyl, carboxyl or maleic anhydride groups, and styrenic resins, all commercially available as "POLY BD," "RICOBOND," "NORSOLENE" respectively from Sartomer Company. They may also be polyacrylate based tackifiers. Any material which retains tackiness at application temperatures is suitable. Such materials are preferably liquids at surface conditions.

C. Methods

1. Coating Particulates and Placing them into a Subterranean Formation

In some embodiments of the methods of the present invention, a silicone-tackifier matrix composition of the present invention may be coated onto particulates and the coated particulates may be placed into a subterranean formation via a well bore (e.g., in a fracturing or gravel packing treatment). The term "coated" does not imply any particular degree of coverage of the particulates with a silicone-tackifier matrix composition. The terms "coated proppant," "coated particulates," or "coated gravel" as used herein means particulates that have been at least partially coated with a silicone-tackifier matrix compositions of the present invention or a component thereof. The particulates may be coated by any suitable method as recognized by one skilled in the art with the benefit of this disclosure, including, but not limited to, chemically coating the particulates by means of spraying, dipping, atomizing, sputtering, fluidizing, stirring, augering, or soaking the particulates in a liquid solution of the silicone-tackifier matrix composition. The coating process can be performed before the actual well treatment, for example, if the composition is coated in part during storage and the remaining ingredients are added just before pumping on an on-the-fly-basis. An example may be to leave out the tackifier for storage purposes and add it before pumping. This assumes that the curing composition is such that only partial curing or partial matrix formation is achieved during storage and the remaining curing or matrix formation is accomplished after placement. This can be achieved, for example, by using a combination of RTV composition and peroxide or platinum or rhodium metal curable compositions as part of the silicone composition. Alternatively, the coating process can be performed "on-the-fly" at the well site, e.g., immediately before or during the well treatment. These well treatments may include gravel packing treatments, propped fracturing treatments, or even fracturing "squeeze" treatments in which an existing fracture and/or formation can be contacted with the coated particulates.

An example of a suitable method of coating the particulates is an on-the-fly method using a sand screw at the well site wherein the silicone-tackifier matrix composition is introduced into the sand screw and augured with the particulates to coat the particulates.

In some embodiments, the resultant coated proppant may be introduced as part of a fracturing or gravel packing process, at any point during one of the methods described above. They may be introduced with a suitable subterranean treatment fluid. Aqueous treatment fluids may be preferred in most instances. The treatment fluids described below are suitable for introducing coated particulates. In a fracturing treatment, preferably the coated proppant particulates are introduced throughout the proppant stage of the fracturing treatment so that the maximum benefits of the present invention can be obtained, including both particulate migration control and flow back control.

A wide variety of particulate materials may be used (e.g., as proppant or gravel) in accordance with the present invention, including, but not limited to, sand; bauxite; ceramic materials; glass materials; resin pre-coated proppant (e.g., commercially available from Borden Chemicals and Santrol, for example, both from Houston, Tex.); polymer materials; "TEFLON"™ (tetrafluoroethylene) materials; nut shells; ground or crushed nut shells; seed shells; ground or crushed seed shells; fruit pit pieces; ground or crushed fruit pits; processed wood; composite particulates prepared from a binder with filler particulate including silica, alumina, fumed carbon, carbon black, graphite, mica, titanium dioxide, metasilicate, calcium silicate, kaolin, talc, zirconia, boron, fly ash, hollow glass microspheres, and solid glass; or derivatives or mixtures thereof. The particulates used may have a particle size in the range of from about 2 to about 400 mesh, U.S. Sieve Series. Preferably, the particulates are graded sand having a particle size in the range of from about 10 to about 70 mesh, U.S. Sieve Series. Preferred sand particle size distribution ranges are one or more of 10-20 mesh, 20-40 mesh, 40-60 mesh or 50-70 mesh, depending on the particle size and distribution of the formation particulates to be screened out by the proppant. For high stress applications (e.g., those involving about 6000 psi or more), preferred particulates are likely ceramic particles and sintered bauxite since these materials have relatively high crush resistance.

2. Treatment Fluids that Comprise a Silicone-Tackifier Matrix Composition of the Present Invention The silicone-tackifier matrix compositions of the present invention may be used in conjunction with any suitable subterranean treatment fluid (e.g., a fracturing or gravel pack fluid). As used herein, the term "treatment," or "treating," refers to any subterranean operation that uses a fluid in conjunction with a desired function and/or for a desired purpose. The term "treatment," or "treating," does not imply any particular action by the fluid or any particular component thereof. In one embodiment, a silicone-tackifier matrix composition of the present invention may be part of a pre-pad or pad fluid that proceeds a proppant slurry fracturing fluid to be pumped downhole during the fracturing operation. Another example is a gravel pack fluid. A silicone-tackifier matrix composition of the present invention may be part of the pre-pad or pad fluid that precedes the gravel slurry (e.g., a gravel pack fluid) to be pumped downhole during a gravel pack treatment. Other treatments in which a silicone-tackifier matrix composition of the present invention may be introduced into a subterranean formation include remedial or matrix treatments for gravel packed, frac-packed, and prop-fractured wells. An example of remedial treatments would be when the sand production or proppant flow back levels are unacceptably high. The silicone composition can be pumped into the zone by using coiled tubing and selectively introducing the composition into the affected zone. Oil-based treatment fluids also may be more suitable as carriers for remedial silicone compositions and include fluids such as diesel, mineral oils, kerosene and organic esters and the like.

In some embodiments, the treatment fluid may contain gas phase. One advantage of using a gasified composition is to improve the elasticity and resiliency of the matrix composition which may minimize particulate crushing due to cyclic stresses. In some embodiments, the foamed treatment fluids have a foam quality of about 0.1% or above. A preferred foam quality level is about 3% or above. When presence of gas is required, hydride containing silicones may be included in the composition (Equation 1 where Z is a hydride). The hydride reactive group upon exposure to moisture or a hydroxide group generates hydrogen gas in situ in the matrix composition. Additionally, due to relatively high viscosity of the composition they have a natural tendency to trap air during mixing operations. Thus additional gas may be incorporated by mechanical mixing while exposed to a gaseous environment. While various gases can be utilized for foaming the treatment fluids of this invention, nitrogen, carbon dioxide, and mixtures thereof are preferred. The amount of gas incorporated during the mixing phase may range from 0.1 to 50% by volume of the composition.

The choice of whether to use a surfactant will be governed at least in part by the mineralogy of the formation. Generally speaking, a surfactant may help facilitate the coating of the particulates by the silicone-tackifier matrix composition. For instance, the tackifying agents used in this invention comprise polymers with ionic groups that may be preferentially attached to particles having an opposite charge. For example, a hydrophobic polymer having a negative charge will preferentially attach to surfaces having a positive to neutral zeta potential and/or a hydrophilic surface. However, a tackifying agent which has polar, nonionic groups may not attach strongly to surfaces which are ionic in nature. Therefore, in particular embodiments, a cationic surfactant may be included to facilitate application of tackifying agent to particulates within the formation. Cationic silanes and silicones are suitable for such applications and should exhibit miscibility with the silicone compositions. Commercially available cationic silanes are available from Siltech Corporation, Toronto, Canada under the trade name of "SILQUAT." Cationic silicones are commercially available under the trade name "RESIL", for example "RESIL BT120" from Resil Chemicals, Pvt. Ltd., Bangalore, India. As will be understood by those skilled in the art, amphoteric and zwitterionic surfactants also may be used so long as the conditions they are exposed to during use are such that they display the desired charge. For example, in particular embodiments, mixtures of cationic and amphoteric surfactants may be used. When used in treatment fluid embodiments, the surfactant is present in an amount of from about 0.01% to about 5% by volume.

In some embodiments, the aqueous carrier fluid utilized to carry the particulate material coated silicone/matrix composition may be foamed. When foamed, the aqueous carrier fluid may comprise a gas. While various gases can be utilized for foaming the treatment fluids of this invention, nitrogen, carbon dioxide, and mixtures thereof are preferred. In examples of such embodiments, the gas may be present in a base fluid and/or a silicone-tackifier matrix composition in an amount in the range of from about 0.1% to about 95% by volume, and more preferably in the range of from about above 3%. The amount of gas to incorporate into the fluid may be affected by factors including the viscosity of the fluid and bottom hole pressures involved in a particular application. Examples of preferred foaming agents that can be utilized to foam the base fluid and/or the silicone-tackifier matrix composition of this invention include, but are not limited to, alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Cocoamidopropyl betaine is especially preferred. Other suitable surfactants available from Halliburton Energy Services include: "19N™," "G-Sperse ™ Dispersant," "Morflo III®" surfactant, "Hyflo® IV M" surfactant, "Pen-88M™" surfactant, "HC-2™ Agent," "Pen-88 HT™" surfactant, "SEM-7™" emulsifier, "Howco-Suds™" foaming agent, "Howco Sticks™" surfactant, "A-Sperse™" Dispersing aid for acid additives, "SSO-21E™" surfactant, and "SSO-21MW™" surfactant. Other suitable foaming agents and foam stabilizing agents may be included as well, which will be known to those skilled in the art with the benefit of this disclosure. The foaming agent is generally present in a base fluid and/or a silicone-tackifier matrix composition of the present invention in an amount in the range of from about 0.01% to about 5.0% by volume, more preferably in the amount of from about 0.2% to about 1.0% and most preferably about 0.6% by volume.

Optionally, the particulate carrier fluid may comprise a gelling agent. Any gelling agent suitable for use in subterranean applications may be used in these compositions, including, but not limited to, natural biopolymers, synthetic polymers, cross linked gelling agents, viscoelastic surfactants, and the like. Guar and xanthan are examples of suitable gelling agents. A variety of gelling agents may be used, including hydratable polymers that contain one or more functional groups such as hydroxyl, carboxyl, sulfate, sulfonate, amino, or amide groups. Suitable gelling agents typically comprise polysaccharides, biopolymers, synthetic polymers, or a combination thereof. Examples of suitable polymers include, but are not limited to, guar gum and derivatives thereof, such as hydroxypropyl guar and carboxymethylhydroxypropyl guar, cellulose derivatives, such as hydroxyethyl cellulose, locust bean gum, tara, konjak, tamarind, starch, cellulose, karaya, diutan, scleroglucan, wellan, gellan, xanthan, tragacanth, and carrageenan, and derivatives or combinations thereof. Additionally, synthetic polymers and copolymers may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the silicone-tackifier matrix compositions of the present invention in an amount in the range of from about 0.1% to about 5% by weight of the water therein. In certain exemplary embodiments, the gelling agents are present in the silicone-tackifier matrix compositions of the present invention in an amount in the range of from about 0.01% to about 2% by volume. If a gelling agent is used, a suitable breaker may be necessary to ultimately reduce the viscosity of the fluid. Any breaker suitable for the subterranean formation and the gelling agent may be used. The amount of a breaker to include will depend, inter alia, on the amount of gelling agent present in the treatment fluid. Other considerations regarding the breaker are known to one skilled in the art with the benefit of this disclosure.

C. Examples of Methods

The silicone-tackifier matrix compositions of the present invention may be used, inter alia, in any suitable well treatment in which it is desirable to control particulate migration or lost circulation. These methods may be performed at any time during the life of the well when the particulate production has reached undesirable levels.

One example of a method of the present invention comprises the steps of: providing a treatment fluid that comprises a silicone-tackifier matrix composition of the present invention that comprises at least one silicone polymer, at least one curing or cross linking agent and a tackifying agent; placing the treatment fluid in a subterranean formation; and allowing the silicone-tackifier matrix to form at least one silicone-tackifier matrix.

In some embodiments, the present invention provides a method of treating a portion of a subterranean formation that comprises: providing a silicone-tackifier matrix composition that comprises a least one silicone polymer, at least one curing or cross linking agent and a tackifying agent; introducing the silicone-tackifier matrix composition to a chosen portion of a subterranean formation; allowing the silicone-tackifier matrix composition to form at least one silicone-tackifier matrix that is capable of preventing particulate migration.

In some embodiments, the silicone-tackifier matrix compositions of the present invention may be used, inter alia, in primary, remedial, or proactive methods. Whether a particular method of this invention is "primary," "remedial," or "proactive" is determined relative to the timing of a fracturing treatment or a gravel packing treatment. The primary methods of the present invention involve using a silicone-tackifier matrix composition of the present invention in conjunction with a fracturing fluid or a gravel pack fluid (e.g., as a component of the fracturing fluid or a gravel pack fluid so that the silicone-tackifier matrix composition is introduced into the subterranean formation as part of the main treatment). The remedial methods are most suited for wells wherein a portion of the well has been fractured and propped. The remedial methods also may be used in a gravel packing situation, for example where there has been a screen problem or failure. The proactive methods are most suited for wells that have not yet been fractured or gravel packed. The proactive methods can be performed in conjunction with a fracturing treatment, for example, as a pre-pad to the fracturing treatment or in any diagnostic pumping stage performed before the main fracturing, gravel packing, or acidizing procedure, if desired.

The silicone-tackifier matrix compositions of the present invention also may be used before, during, or after in a fracture acidizing or a matrix acidizing process. This is possible because the non-aqueous tackifying agent is not activated by the HCl used in such acidizing procedures.

One of ordinary skill in the art will recognize that the present invention may be useful to stabilize other types of particulates, such as the coatings (also referred to as "grapeskin") left over from some encapsulated materials.

The methods of the present invention are especially suitable for coal bed methane well ("CBM") applications, wherein it is desirable to control the large volume of formation fines that are usually present in such formations. If left untreated, these fines can lower the production of a well to the point where it might not be economically viable. By treating these fines in accordance with the present invention, the production decline curve of these wells may be improved.

Below are some additional examples of some of the primary, remedial, and proactive methods of the present invention.

1. Examples of Some Primary Methods

In some embodiments, a silicone-tackifier matrix composition of the present invention may be used in a primary method with a well treatment fluid, such as a pre-pad fluid, a pad fluid, a fracturing fluid, or a gravel pack fluid (either as a component of the fluid itself of coated on proppant and gravel particulates).

One example of such a method comprises: providing a pre-pad or pad fluid that comprises a silicone-tackifier matrix composition of the present invention (optionally coated onto particulates); placing the fluid into a portion of the subterranean formation at a pressure sufficient to create or enhance a fracture therein; and allowing the silicone-tackifier matrix composition to consolidate particulates within the portion of the subterranean formation.

Another embodiment of a primary method of the present invention comprises the steps of: providing a fracturing fluid comprising a plurality of proppant particulates that have been coated with a silicone-tackifier matrix composition that comprises a silicone polymer component, curing agent and a tackifying agent; placing the fracturing fluid into a portion of the subterranean formation at a pressure sufficient to create or enhance a fracture therein; and allowing the proppant particulates to consolidate to form a cohesive mass within the formation. A "cohesive mass" as that term is used herein refers to a cohesive and tacky collection of particulates. No particular shape or location within the subterranean formation is implied by the term.

The fluids in these primary embodiments may comprise those things usually found in subterranean pre-pad, pad, or fracturing fluids including, but not limited to, an aqueous base fluid, proppant particulates, gelling agents, surfactants, breakers, buffers, a gas phase (if the fracturing fluid is foamed or commingled), coupling agents, and the like.

One example of a primary gravel pack method of the present invention comprises: providing a gravel pack fluid that comprises gravel, a brine, optionally a gelling agent, and a silicone-tackifier matrix composition, the silicone-tackifier matrix composition comprising a silicone polymer component, curing or cross linking agent and a tackifying agent; contacting the portion of the subterranean formation with the gravel pack fluid so as to place a gravel pack in or near a portion of the subterranean formation; allowing the silicone-tackifier matrix composition to form a silicone-tackifier matrix in or near the gravel pack; and allowing the matrix to stabilize or prevent the flow of particulates within the subterranean formation. In alternative embodiments of such methods, the silicone-tackifier matrix composition may be coated on at least some of the gravel particulates.

The gravel pack fluids used in these embodiments may be any suitable gravel pack fluid, and it may comprise those things usually found in gravel pack fluids including, but not limited to, an aqueous base fluid, gravel particulates, gelling agents, surfactants, breakers, buffers, a gas phase (if the fluid is foamed or commingled), and the like.

2. Remedial Methods

In some remedial embodiments of the present invention, after a fracturing treatment or a gravel pack treatment has been performed, a silicone-tackifier matrix composition of the present invention may be introduced into an unconsolidated zone of a subterranean formation to stabilize particulates within the zone. The silicone-tackifier matrix composition may be coated on particulates that are then added or added with a fluid. In such embodiments, it may be desirable to include a breaker or an enzyme in the silicone-tackifier matrix composition to interact with any undesirable gel residue that may be present. The silicone-tackifier matrixes that form may disperse any loose fines within a proppant pack in a fracture, move any fines away from the fracture (or near well bore), stabilize gravel particulates around a screen, stabilize a screen failure, and lock the fines in the formation without causing damage to the permeability of the formation.

In some embodiments, the silicone-tackifier matrix composition (either with a fluid or coated on particulates) will be placed into at least one propped fracture within an unconsolidated zone of a subterranean formation. The silicone-tackifier matrix composition will form a matrix therein.

In the remedial embodiments, the silicone-tackifier matrix compositions of the present invention may be introduced to the subterranean formation with any suitable base fluid. Suitable aqueous base fluids include fresh water, salt water, brine, seawater, or any other aqueous liquid that does not adversely react with the other components used in accordance with this invention or with the subterranean formation. One should note that if the aqueous base fluid comprises a large concentration of salts, then those salts may act as an activator for the tackifying agent, which may not be desirable. As recognized by one of ordinary skill in the art, while usually preferred, the aqueous tackifying agent and delayed acid-releasing activator are not required to be in the same fluid or stage of the treatment.

3. The Proactive Methods

The proactive methods of the present invention are most suited for wells that have not been fractured or gravel packed yet. These methods can be used as a pre-treatment before a fracturing treatment or at the early stage of a fracturing treatment (including diagnostic pumping) as a pre-pad treatment.

In some embodiments, the proactive methods of the present invention comprise placing a silicone-tackifier matrix composition before or as part of a pre-pad of a fracturing treatment into a subterranean formation. The second step involves fracturing a portion of the subterranean formation. This fracturing step may include the introduction of some proppant into the formation. This proppant may be coated, uncoated, or a combination thereof (i.e., some coated, then some uncoated, and so on). Some may be coated with a silicone-tackifier matrix composition of the present invention. In some embodiments, from an economic point of view, it may be preferable to introduce the coated proppant at the end of the fracturing treatment. The third step involves introducing proppant during the fracturing treatment into the fractures created in the fracturing treatment. The proppant may form proppant packs in the fractures. All three steps may be performed with a single fluid.

To facilitate a better understanding of the present invention, the following examples of certain aspects of some embodiments are given. In no way should the following examples be read to limit, or define, the entire scope of the invention.

EXAMPLES

Material Testing: Two series of room temperature vulcanized (RTV) silicone polymers and curing agents were supplied by Silicones, Inc. The GI-series of silicones are hydroxyl terminated silicone polymers that are cured via a condensation mechanism with the aid of tin catalysts. The P-series silicones possess terminal olefin groups and cure by the addition mechanism with the aid of platinum catalysts. These silicones, along with other polyisobutylene and polybutadiene polymers, were tested individually and in combination to determine their usefulness as proppant coating materials and consolidation agents.

Peroxide Initiated Cure Example: Peroxide initiators were tested as a replacement for the platinum and tin based curing agents provided with the RTV-silicone samples from Silicones, Inc. tert-butyl peroxide (10 vol. % relative to polymer) was added to GI-1210 silicone, P-4 silicone, and a polyisobutylene sample (TPC 595) from Texas Petrochemicals. All of these samples were mixed thoroughly and heated at 200° F. for approximately 1.5 hours. At that time, it appeared that only the P-4 sample was curing (albeit very weakly). The samples were then heated at 235° F. for two hours. Only the P-4 sample had cured (was tacky and unpourable) whereas the GI-1210 and TPC 595 samples appeared unchanged.

A similar series of experiments were performed using benzoyl peroxide. Benzoyl peroxide was dissolved in toluene to facilitate mixing. To samples of GI-1210 silicone, P-4 silicone, TPC 595 polyisobutylene, and hydroxy-terminated polybutadiene (PB R45HTLD) was added the benzoyl peroxide/toluene solution (final concentration of 2% benzoyl peroxide). Each sample was mixed thoroughly and heated at 200° F. for four hours. After that time, none of the samples had cured (all remained as a pourable fluid) except for the P-4 silicone sample. It was no longer pourable and very tacky to the touch.

The above experiments show that olefin terminated silicones can be used in combination with either platinum or peroxide types of curing agents for curing at elevated temperatures. Such compositions form matrixes, which can retain the tackifiers physically trapped inside matrix with reduced leachout. The results also demonstrate that matrix compositions can be designed to cure partially under ambient combinations, for example using GI Series silicones and complete the curing in situ after placement by using high temperature curing components in the compositions.

Curing Agent Testing: It was initially believed that because the polyisobutylene polymers (available from Texas Petrochemicals, Inc.) contained olefins at their termini, they would copolymerize with the olefin terminated P-series silicones. However, this did not prove to be the case. Several different samples of Texas Petrochemicals' polyisobutylenes having various molecular weights were mixed with the platinum catalyst curing agent provided with the P-4 silicone polymer. Neither time nor temperature ever afforded any curing of the polyisobutylene.

Similarly, because the hydroxy-terminated polybutadiene polymers (Sartomer Inc.) possess a similar terminal functionality to the hydroxyl-terminated GI-series of silicones, the GI-series of curing agents were tested with the polybutadiene "PB R45HTLD." A GI-series tin catalyst curing agent would not cause the hydroxypolybutadiene to cure under a wide variety of conditions. These results suggest that hydroxypolybutadienes and polybutenes are good candidates for forming Semi-IPN Non-covalent matrix compositions.

Polymer Mixing and Curing: In preliminary experiments, silicone polymers were mixed with several different MW polyisobutylenes (PIB) in the absence of curing agents. The two polymer systems typically mixed well and appeared homogenous for several days when stored at room temperature. When left for extended periods of time (on the order of 4 to 8 days), phase separation of the two components became evident. When an identical series of experiments were performed in the presence of curing agents, the system would cure and solidify to form a homogenous sample well before any signs of phase separation were visible.

In the case of mixed silicone-polyisobutylene samples, the materials were sticky to the touch in many cases. For 1:1 mixtures of silicone-PIB, the cured samples were moderately tacky whereas the tackiness increased with larger proportions of the PIB. However, as the PIB concentration increased (and silicone concentration decreased) the strength of the sample decreased. The strength of the material and the degree of tackiness are two properties that are contained within these samples that can be optimized with further experimentation by one skilled in the art.

Sand Coating and Consolidation: A sample of 20/40 sand (Unimin) was coated with 3 wt % of GI-1210 silicone polymer containing 10% (v/v) of Ultra-Fast Cat (UFC) curing agent. The sample was mixed thoroughly to ensure that all of the sand was coated. A portion of the coated sand was packed in a proppant flow back cell and sealed. This sample was placed in a 210° F. oven for 15 minutes and then allowed to cool to room temperature. The sample cell was fitted with a ½ inch perforation. Water was then flowed through the cell at increasing rates to determine if the coated sand sample would remain consolidated against high flow rates. Water was flowed through the coated proppant sample at the maximum available rate (6 liters/min, 1.6 gal/min) and there was no visible loss of sand throughout the test. A photograph and SEM micrograph of the sample (after the proppant flow back test) are shown in FIGS. 4 and 5.

A similar experiment was performed using a 1:1 mixture of the GI-1210 silicone (with 10% (v/v) UFC curing agent) and TPC 595 isobutylene (950 MW, olefin terminated polyisobutylene). A sample of 20/40 sand (Unimin) was coated with 3 wt % of the silicone/PIB mixture by thorough mixing to ensure complete coating. A portion of the coated sand was packed and sealed in a proppant flow back cell and cured at 210° F. for 15 min. The sample was allowed to cool to room temperature. The sample cell was then fitted with a ½ inch perforation. Water was flowed through the cell up to a maximum rate of 6 liters/min and the coated sand sample remained fully consolidated (no sand came out of the cell during the flow testing). A photograph and SEM picture of the GI-1210/TPC 595 coated sand sample (after proppant flow back test) are shown in FIGS. 6 and 7. The unique feature of this sample is that the coated sand, after curing, felt slightly tacky to the touch suggesting that compositions are suitable to serve as tackifying particulate consolidation compositions.

Two additional samples were prepared using lower concentrations of the GI-1210 silicone polymer. SEM pictures of 20/40 sand (Unimin) coated with 2 wt % and 1 wt % GI-1210 (with 10% (v/v)) UFC curing agent) are shown in FIGS. 8 and 9, respectively. At each of these concentrations, the sand sample was consolidated and could be moved around as one bulk piece. The coating at 2 wt % was quite strong and appeared similar to its 3 wt % counterpart. The sand sample coated with 1 wt % silicone polymer was somewhat weaker.

Proppant Coating and Solvent Compatibility: The cured and consolidated sand samples that were tested in the proppant flow back cell were also tested for solvent compatibility with the coating material. Samples of the GI-1210 silicone coated sand and GI-1210:TPC 595 PIB coated sand (FIGS. 3 and 5) from Example describing Sand Coating and Consolidation experiment were soaked in a xylene/hexane mixture (1:1). A portion of each flow back test sample core (approx. 50-55 grams) was immersed in an equal weight of xylene/hexane solution. These samples were stored at room temperature for a period of two weeks. During that time, the structural integrity of the consolidated sand samples appeared unaltered. The solvents were removed from each of the coated sand samples and then dried in a vacuum oven at 220° F. for a period of 1 hour. Again, the physical appearance and integrity of the sand samples was unchanged. Samples of each were submitted for SEM micrographs. SEM pictures are shown in FIGS. 8 and 9. The surface of the samples (shown in FIGS. 8 and 9) after extraction and heating appear somewhat different from the original coated samples (compare to FIGS. 4 and 5, respectively).

On-the-Fly Proppant Coating: Brady sand of 20/40-mesh size in the amount of 250 grams was coated with 10 grams of a silicone mixture (9 grams of GI-1000 lot # 23397, and 1 gram of GI-1000 lot # 23411). The coated sand was added to 300 ml of 3% KCl brine and stirred for 10 seconds. The slurry was then packed in a brass flow cell and cured for 20 hours at 175° F. After the curing period, the coated sand pack was extruded from the cell. The core appeared flexible. Measurements of unconfined compressive strength (UCS) were performed. Average UCS value was 42 psi.

Similar to the test above, Brady sand of 20/40 mesh size in the amount of 250 grams was coated with 10 grams of silicon mixture (9 grams of GI-1000 Lot #23397 and 1 gram of GI-1000 Lot # 23411). The coated sand was added to 300 ml of 3% KCL brine and stirred for 10 seconds. The slurry was then packed in a brass flow cell and cured for 20 hours at 325° F. Again the core was observed to be softer and more flexible than the one cured at 175° F. No UCS measurement was performed for the core.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
providing a treatment fluid that comprises a base fluid and a silicone-tackifier matrix composition that comprises at least one curable silicone polymer component, at least one tackifying agent, and at least one curing agent;
placing the treatment fluid in a subterranean formation; and
allowing the silicone-tackifier matrix to form at least one silicone-tackifier matrix therein wherein the tackifying agent component retains a tacky nature as part of the matrix.

2. The method of claim 1 wherein the treatment fluid is placed in the subterranean formation as part of a gravel packing treatment.

3. The method of claim 1 wherein the treatment fluid is placed in the subterranean formation after a gravel pack treatment has been performed.

4. The method of claim 1 wherein the treatment fluid is placed in the subterranean formation before a fracturing treatment has been performed.

5. The method of claim 1 wherein the silicone-tackifier matrix is capable of stabilizing particulates or grapeskin within the formation.

6. The method of claim 1 wherein the subterranean formation comprises a coal bed methane well.

7. The method of claim 1 wherein the treatment fluid is a gravel pack fluid.

8. The method of claim 1 wherein at least a portion of the silicone-tackifier matrix composition is coated onto at least a plurality of particulates.

9. The method of claim 1 further comprising the step of performing a gravel pack treatment.

10. The method of claim 1 wherein the treatment fluid further comprises at least one cross linking agent.

11. A method of treating a portion of a subterranean formation comprising:
providing a silicone-tackifier matrix composition that comprises at least one curable silicone polymer component, at least one tackifying agent, and at least one curing agent;
introducing the silicone-tackifier matrix composition to a chosen portion of a subterranean formation; and
allowing the silicone-tackifier matrix composition to form therein at least one silicone-tackifier matrix that is capable of preventing particulate migration therein wherein the tackifying agent component retains a tacky nature as part of the matrix.

12. The method of claim 11 wherein at least a portion of the silicone-tackifier matrix composition is coated onto at least a plurality of particulates.

13. The method of claim 11 wherein the silicone-tackifier matrix composition further comprises at least one cross linking agent.

14. A method comprising:
providing a gravel pack fluid that comprises gravel, a brine, and a silicone-tackifier matrix composition that comprises at least one curable silicone polymer component, at least one tackifying agent, and at least one curing agent;
contacting a portion of a subterranean formation with the gravel pack fluid so as to place a gravel pack in or near a portion of the subterranean formation;
allowing the silicone-tackifier matrix composition to form a silicone-tackifier matrix in or near the gravel pack and wherein the tackifying agent component retains a tacky nature as part of the matrix; and
allowing the matrix to stabilize or prevent the flow of particulates within the subterranean formation.

15. The method of claim 14 wherein at least a portion of the silicone-tackifier matrix composition is coated on at least a plurality of gravel particulates.

16. The method of claim 14 wherein the gravel pack fluid further comprises at least one component selected from the group consisting of: a gelling agent, a cross linking agent, and a combination thereof.

* * * * *